(12) United States Patent  
Tsuruta

(10) Patent No.: US 10,744,956 B2  
(45) Date of Patent: Aug. 18, 2020

(54) VEHICULAR DISPLAY CONTROL DEVICE

(71) Applicant: TOYOTA JIDOSHA KABUSHIKI KAISHA, Toyota-shi, Aichi-ken (JP)

(72) Inventor: Yuki Tsuruta, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/370,740

(22) Filed: Mar. 29, 2019

(65) Prior Publication Data

US 2019/0351839 A1 Nov. 21, 2019

(30) Foreign Application Priority Data

May 15, 2018 (JP) ................................. 2018-093900

(51) Int. Cl.
*B60R 11/02* (2006.01)
*B60R 11/04* (2006.01)

(52) U.S. Cl.
CPC ...... *B60R 11/0264* (2013.01); *B60R 11/0229* (2013.01); *B60R 11/04* (2013.01); *B60R 2300/205* (2013.01); *B60R 2300/301* (2013.01); *B60R 2300/308* (2013.01)

(58) Field of Classification Search
None
See application file for complete search history.

(56) References Cited

U.S. PATENT DOCUMENTS

| 2017/0270899 A1* | 9/2017 | Sato | G06T 11/60 |
| 2019/0189014 A1* | 6/2019 | Murai | G08G 1/164 |
| 2019/0248288 A1* | 8/2019 | Oba | B60R 1/00 |
| 2019/0333252 A1* | 10/2019 | Maeda | B60R 1/06 |

FOREIGN PATENT DOCUMENTS

JP 2017-216509 A 12/2017

* cited by examiner

*Primary Examiner* — Benjamin C Lee
*Assistant Examiner* — Krishna P Neupane
(74) *Attorney, Agent, or Firm* — Oliff PLC

(57) ABSTRACT

The vehicular display control device which controls an image that is projected on a windshield of a vehicle, includes: a detection section which detects an object near the vehicle; and a display control section which displays, when a first object is detected in front of the vehicle, a first image for attracting attention to the first object, at a predetermined position in a first region on the windshield, and displays, when a second object is detected on a lateral side relative to, or behind, the vehicle, a second image for attracting attention to the second object, at a predetermined position in the first region. When determining that a display position of the second image overlaps, in the first region, with a display position of the first image, the display control section moves the second image from the first region to a second region on the windshield.

6 Claims, 5 Drawing Sheets

VEHICULAR DISPLAY CONTROL DEVICE

BACKGROUND OF THE INVENTION

Field of the Invention

The present invention relates to a display control device to be mounted to a vehicle.

Description of the Background Art

As a display control device mounted to a vehicle, a so-called head-up display (HUD) has been known which projects, on a surface of the windshield of the vehicle, an image that indicates information such as a vehicle speed, whether or not there is any pedestrian, or a guide sign, thereby displaying the information on the surface.

Patent document 1 (Japanese Laid-Open Patent Publication No. 2017-216509) discloses a display control device in which a taken image of a right area behind the vehicle, a taken image of a left area behind the vehicle, and a taken image of an obstacle existing in an area near the vehicle, are displayed, by using respective dedicated head-up displays, in respective non-overlapping regions on a windshield surface.

Device cost increases for a configuration in which, as in the above-described display control device disclosed in Patent document 1, images are displayed with dedicated head-up displays being provided for respective imaging areas. Accordingly, it is conceivable to employ a configuration in which images of all of the imaging areas are displayed by using only one head-up display.

However, in a case where a plurality of images are displayed by using a single head-up display, when the plurality of images are displayed so as to overlap with each other on a windshield surface, the visibility, for a driver, of the images (information) is reduced, and attention may not be able to be appropriately attracted to an object such as an approaching vehicle or an obstacle.

SUMMARY OF THE INVENTION

The present invention has been made in view of the aforementioned problems, and an object of the present invention is to provide a vehicular display control device with which the visibility, for a driver, of an image can be inhibited from being reduced and attention can be appropriately attracted to an object detected near the vehicle.

In order to solve the above-described problem, one mode of the present invention is a vehicular display control device which controls an image that is projected on a windshield of a vehicle by using a head-up display function, the vehicular display control device including: a detection section configured to detect an object near the vehicle; and a display control section configured to display, when a predetermined first object is detected in front of the vehicle by the detection section, a first image for attracting attention to the first object, at a position that is based on the first object and that is in a predetermined first region on the windshield, and configured to display, when a predetermined second object is detected on a lateral side relative to the vehicle or behind the vehicle by the detection section, a second image for attracting attention to the second object, at a predetermined position in the first region, wherein, when determining that a display position of the second image overlaps, in the first region, with a display position of the first image, the display control section moves the second image from the first region to a predetermined second region, on the windshield, different from the first region so as to display the second image in the second region.

In the vehicular display control device according to the one mode, the attention-attracting image for the second object is moved to the second region so as to be displayed in the second region when it is determined that the display position of the attention-attracting image for the first object detected in front of the vehicle, and the display position of the attention-attracting image for the second object detected on a lateral side relative to the vehicle or behind the vehicle, overlap with each other in the first region of the windshield. Accordingly, the visibility, for the driver, of the attention-attracting images can be inhibited from being reduced, and attention can be appropriately attracted to the objects detected near the vehicle.

In the one mode, an augmented reality display region in which an image can be displayed so as to overlap with a real view in front of the vehicle, may be used as the first region, and the display control section may display, in the first region, the first image at such a position as to overlap with the first object.

Accordingly, attention can be more appropriately attracted to the first object.

In addition, in the one mode, when the first image determined to overlap, in the first region, with the second image in terms of display position is not displayed any more, the display control section may move the second image from the second region to the first region so as to display the second image in the first region.

Accordingly, attention can be more appropriately attracted to the second object.

In addition, in the one mode, the display control section may cause a display position in the first region or a display manner in the first region to be different between: the second object detected on a lateral side relative to the vehicle by the detection section; and the second object detected behind the vehicle by the detection section.

Accordingly, attention can be attracted to the object detected on the lateral side relative to the vehicle and the object detected behind the vehicle such that these objects are distinguished from each other.

With the above-described vehicular display control device according to the present invention, the visibility, for the driver, of the images can be inhibited from being reduced, and attention can be appropriately attracted to the objects detected near the vehicle.

These and other objects, features, aspects and advantages of the present invention will become more apparent from the following detailed description of the present invention when taken in conjunction with the accompanying drawings.

DESCRIPTION OF THE PREFERRED EMBODIMENTS

[Outline]

The present invention is a vehicular display control device for controlling an image that is projected on the windshield of a vehicle by using a head-up display function. In the display control device, when it is determined that the display position of an attention-attracting image for a first object detected in front of the vehicle and the display position of an attention-attracting image for a second object detected on a lateral side relative to the vehicle or behind the vehicle overlap with each other in a first region of the windshield, the attention-attracting image for the second object is moved to a second region different from the first region so as to be displayed in the second region. Accordingly, the visibility, for the driver, of the attention-attracting images can be inhibited from being reduced, and attention can be appropriately attracted to the objects detected near the vehicle.

[Configuration]

Figure 1:
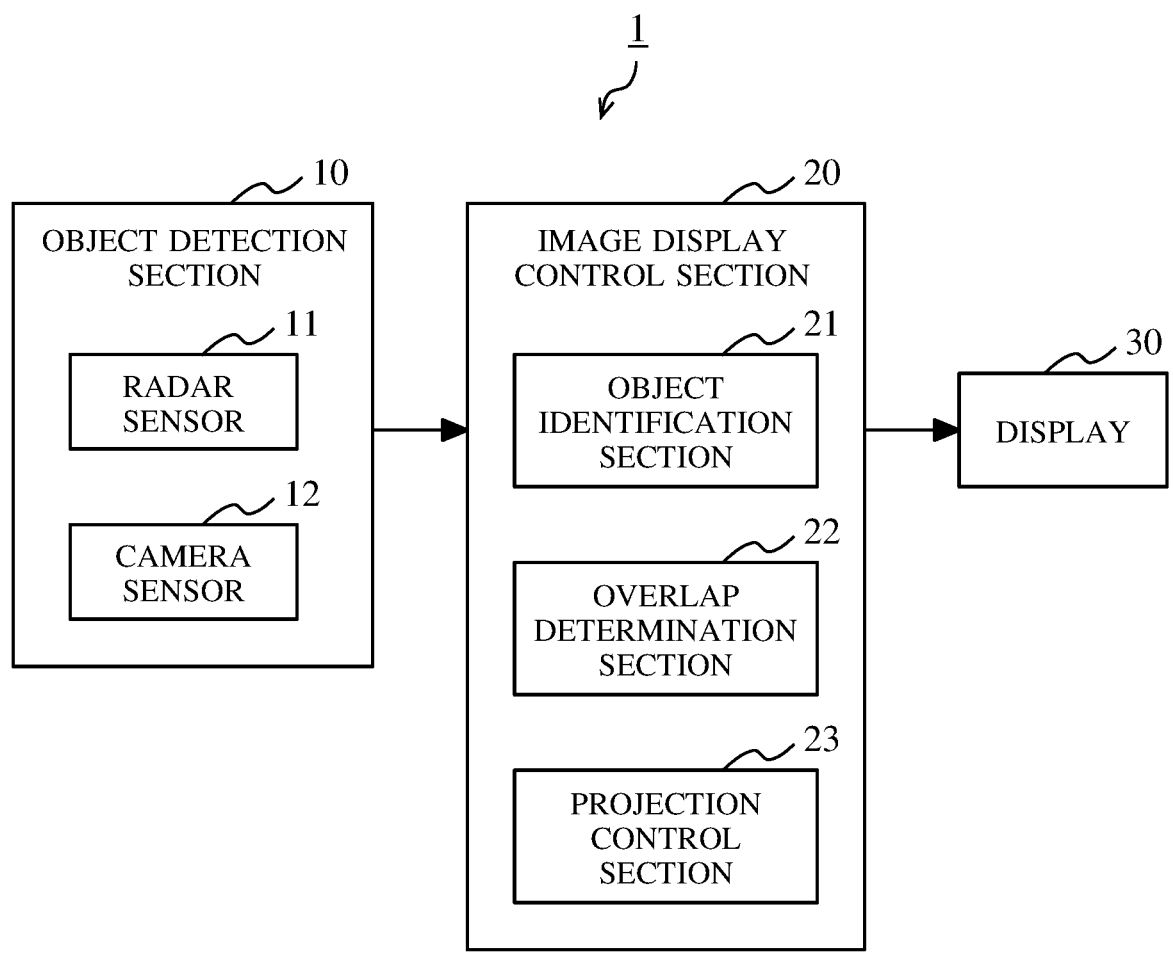
FIG. 1 is a schematic configurational diagram of a vehicular display control device according to an embodiment of the present invention.

FIG. 1 is a diagram for schematically explaining a configuration of a vehicular display control device 1 according to an embodiment of the present invention. In FIG. 1, the vehicular display control device 1 according to the present embodiment includes an object detection section 10 and an image display control section 20, and controls an image that is displayed on a windshield 30 of the vehicle.

The windshield 30 is a member on which a predetermined image (information) is displayed in a predetermined display region in accordance with control by the image display control section 20 described later. In the present embodiment, the display region of the windshield 30 is divided into: a first region through which the driver can visually recognize the real view of the outside of the vehicle; and a second region different from the first region. Images are displayed in accordance with a given situation by using the two regions.

The object detection section 10 can detect an object existing near (in front of, on a lateral side relative to, or behind) the vehicle, and can acquire information (a distance, a direction, and the like) about the detected object. Examples of the object to be detected include a pedestrian, a bicycle, a two-wheeled vehicle, another automobile, a road sign, a traffic lane marking line, and a guide signboard. For the detection of the object, a radar sensor 11 (a laser radar, a millimeter-wave radar, or the like) and a camera sensor 12 (a CMOS, a CCD, or the like) provided at each of a front part, side parts, and a rear part of the vehicle are used, for example. The object detected by the object detection section 10 and the information about this object are outputted to the image display control section 20.

On the basis of the object detected by the object detection section 10, the image display control section 20 can display, by using a head-up display (HUD) function, an image for attracting attention of the driver of the vehicle to the object, in the display region (a first region, a second region) of the windshield 30. Typically, the image display control section 20 can be implemented by an electronic control unit (ECU) including a processor, a memory, an input/output interface, and the like. The image display control section 20 realizes functions as an object identification section 21, an overlap determination section 22, and a projection control section 23 which are described below, by the processor reading out and executing programs stored in the memory.

The object identification section 21 identifies a predetermined object (hereinafter, referred to as "first object") to which attention needs to be attracted, from among one or more objects detected in front of the vehicle by the object detection section 10. The first object is an object, e.g. a pedestrian or a bicycle, that the driver can visually recognize through the windshield 30. The object identification section 21 sets, on the basis of the position of the detected first object, a position at which an attention-attracting image predetermined for making the driver aware of the first object is to be displayed in the first region of the windshield 30. In a case where a plurality of the first objects are identified, display positions are set for the respective first objects.

Figure 2:
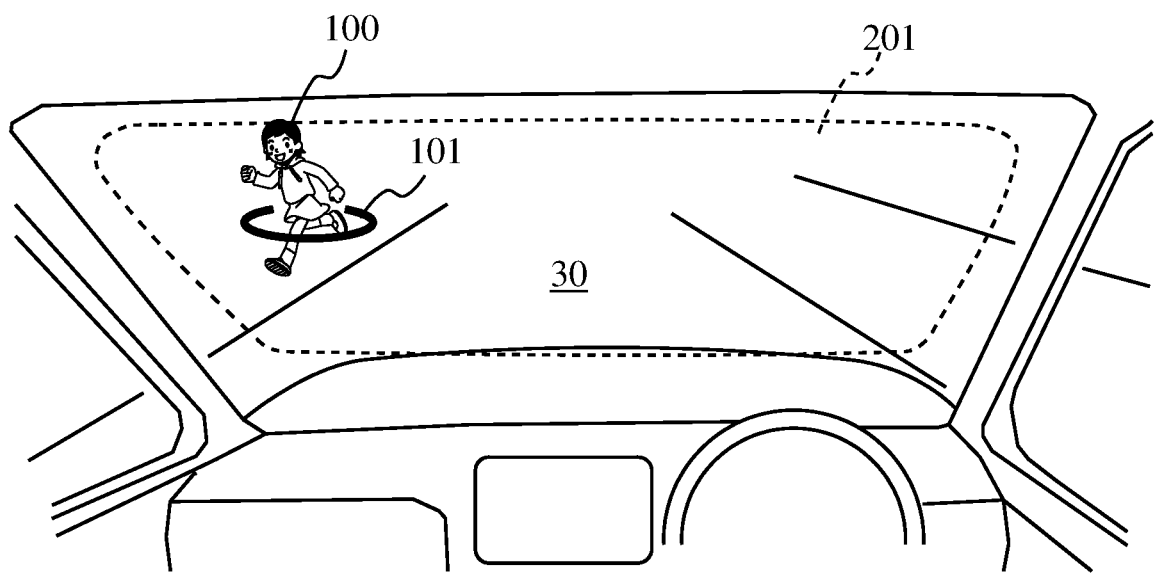
FIG. 2 is an exemplary view in which an attention-attracting image for a first object is displayed on a windshield.

FIG. 2 shows an example in which the attention-attracting image for the first object is displayed in the display region of the windshield 30. In the example shown in FIG. 2, the display position of an attention-attracting image 101 for a first object 100 is set in a first region 201 of the windshield 30 such that the attention-attracting image 101 overlaps with, or is in contact with, the real-image first object 100 when the driver visually recognizes the first object 100 existing outside of the vehicle through the windshield 30. Accordingly, attention can be more appropriately attracted to the first object 100. The display position of the attention-attracting image 101 is desirably changed so as to follow the movement of the first object 100. The attention-attracting image may be displayed at such a position as to neither overlap with, nor be in contact with, the real-image first object as long as being displayed so as to allow identification of the first object to which attention is to be attracted and allow the first object to be indicated to the driver.

The object identification section 21 identifies a predetermined object (hereinafter, referred to as "second object") to which attention needs to be attracted, from among one or more objects detected on a lateral side relative to the vehicle or behind the vehicle by the object detection section 10. Typically, the second object is an object, e.g. a two-wheeled vehicle or an automobile that are following the vehicle, that it is impossible for the driver to visually recognize through the windshield 30 or it is hard for the driver to recognize through the windshield 30. In accordance with the area in which the second object is detected, the object identification section 21 sets, to a predetermined position, a position at which an attention-attracting image predetermined for making the driver aware of the second object is to be displayed in the first region of the windshield 30. For example, the display position in the first region may be made different between: the second object detected on a lateral side relative to the vehicle by the object detection section 10; and the second object detected behind the vehicle by the object detection section 10. By doing so, attention can be attracted to the object detected on the lateral side relative to the vehicle and the object detected behind the vehicle such that these objects are distinguished from each other. Alternatively, the display manner in the first region may be made different between: the second object detected on a lateral side relative to the vehicle by the object detection section 10; and the second object detected behind the vehicle by the object detection section 10.

Figure 3:
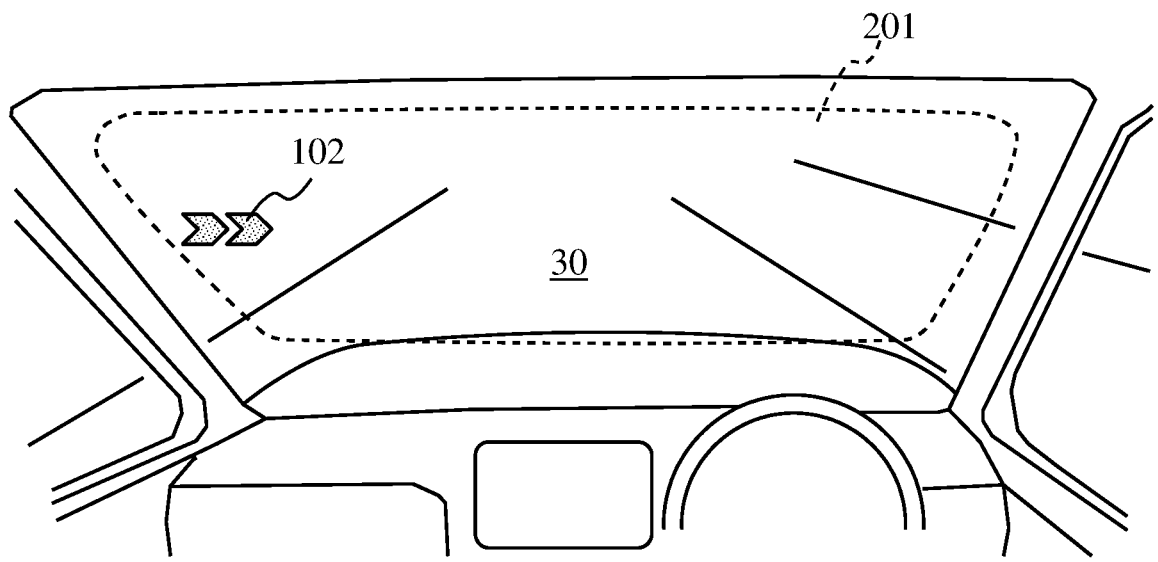
FIG. 3 is an exemplary view in which an attention-attracting image for a second object is displayed on the windshield.

FIG. 3 shows an example in which the attention-attracting image for the second object is displayed in the display region of the windshield 30. In the example shown in FIG. 3, the display position of an attention-attracting image 102 for the second object that the driver cannot visually recognize through the windshield 30, is set to a predetermined fixed position in the first region 201 of the windshield 30. In the example show in FIG. 3, the attention-attracting image 102 for the second object (for example, a two-wheeled vehicle) that is detected in a left area behind the vehicle by the object detection section 10 and that is identified by the object identification section 21, is displayed at a left end part of the first region 201 of the windshield 30.

In a case where the second object is identified by the object identification section 21 while the attention-attracting image for the first object is displayed in the first region 201 of the windshield 30, the overlap determination section 22 determines whether or not the position at which the attention-attracting image for the first object is displayed and the position at which the attention-attracting image for the second object is displayed, overlap with each other in the first region 201.

The projection control section 23 can display the attention-attracting image at a predetermined position in the display region by projecting the image on a surface of the windshield 30 by means of visible light from, for example, a projector disposed in a dashboard or an instrument panel. The projection control section 23 according to the present embodiment performs, in the following manner, control on the basis of the object identification by the object identification section 21 and the image-overlap determination by the overlap determination section 22 such that the attention-attracting image for the second object is displayed in the first region of the windshield 30 or displayed in the second region of the windshield 30.

[Control]

Figure 4:
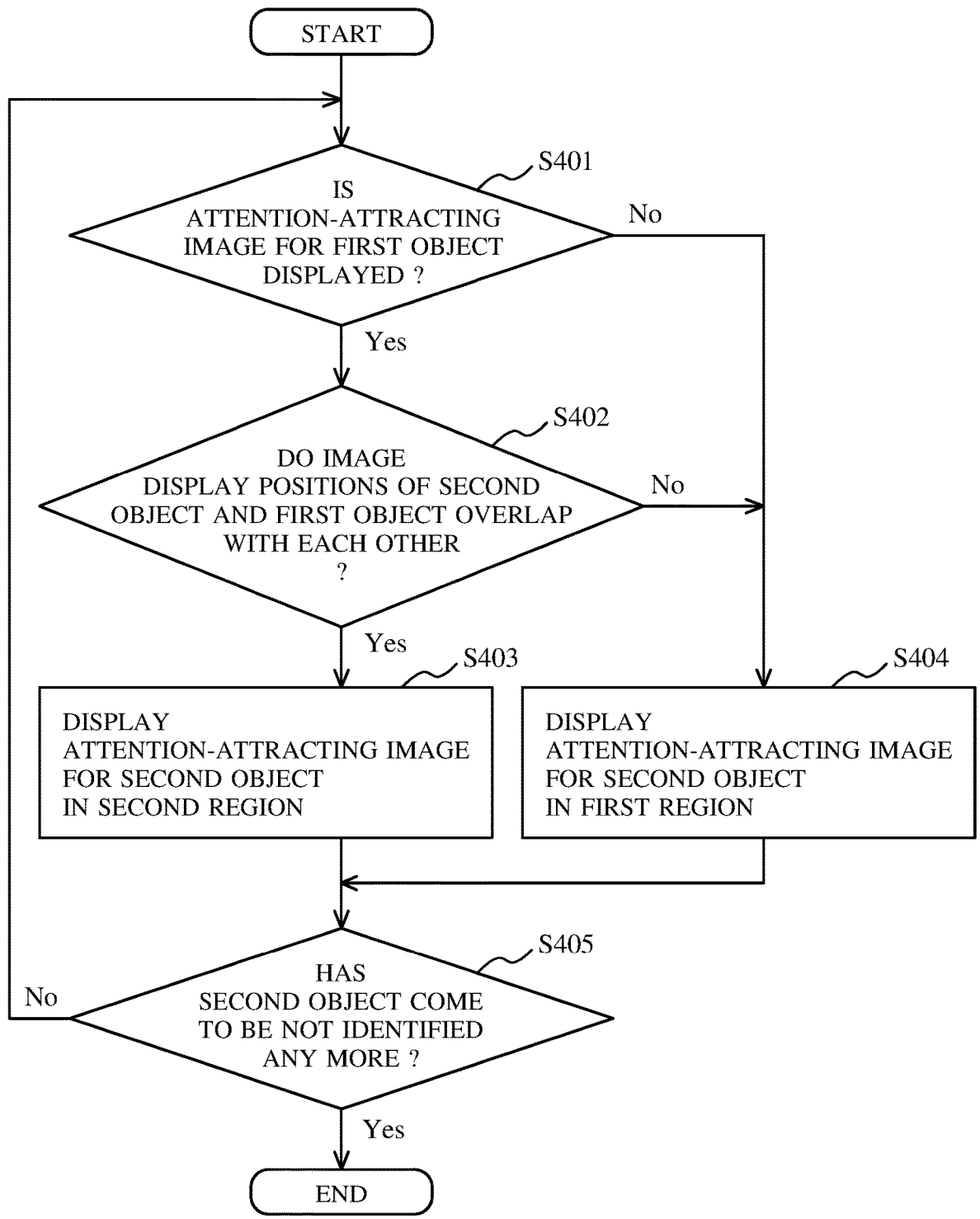
FIG. 4 is a flowchart indicating process steps of image display control by an image display control section.
Figure 5:
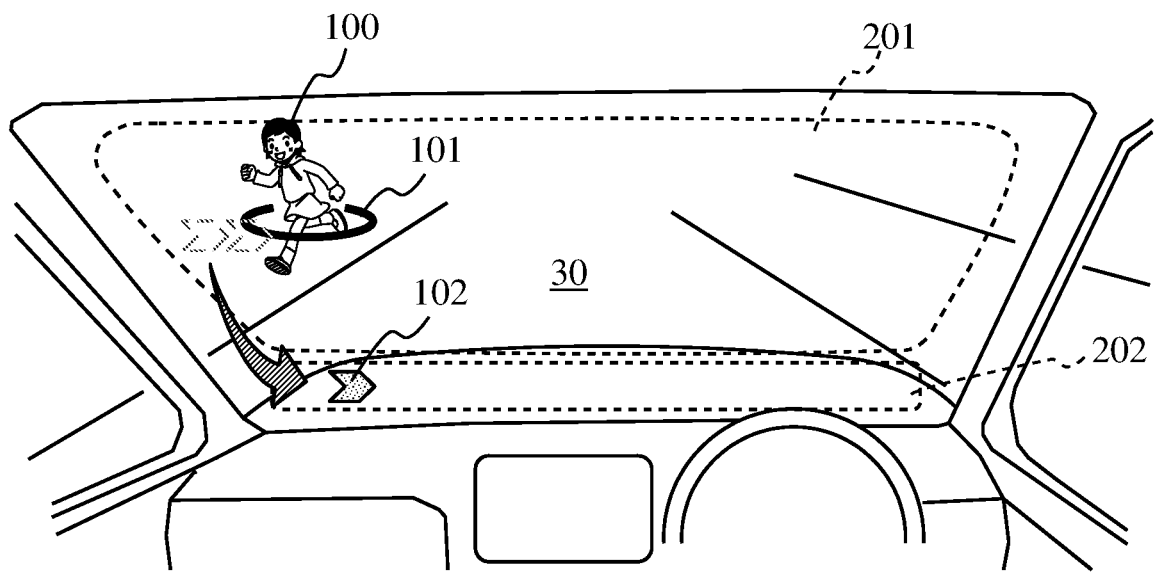
FIG. 5 and FIG. 6 are exemplary views in each of which the attention-attracting images for the first object and the second object are displayed on the windshield.
Figure 6:
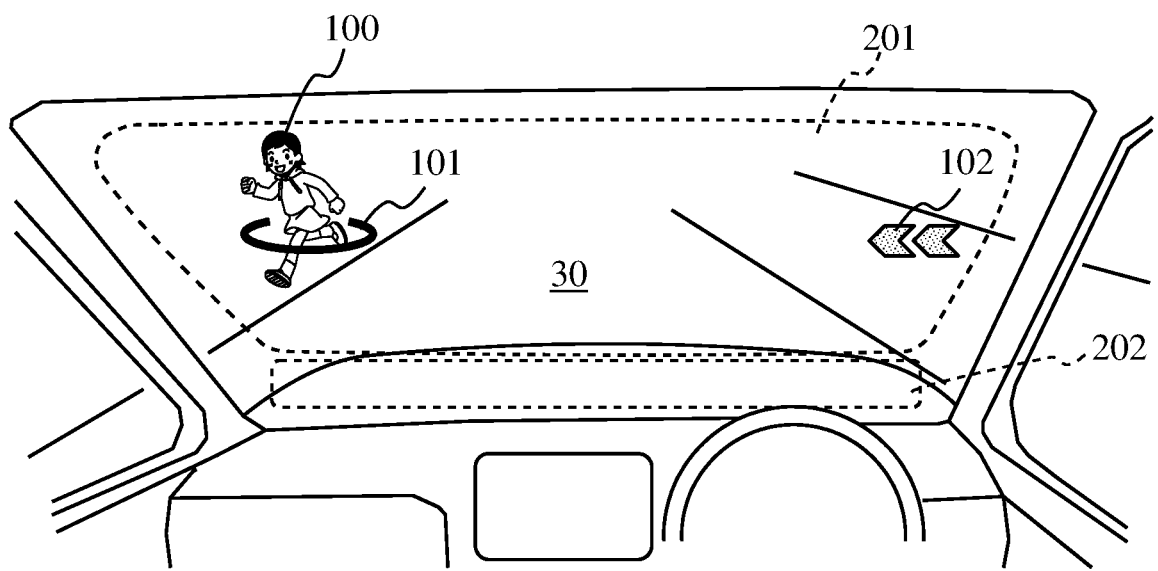

Next, control executed by the vehicular display control device 1 according to the embodiment of the present invention will be described with reference to FIG. 4 to FIG. 6. FIG. 4 is a flowchart indicating process steps of image display control performed by the image display control section 20. FIG. 5 and FIG. 6 are views showing examples in each of which the attention-attracting images for the first object and the second object are displayed in the display region of the windshield 30.

The image display control indicated in FIG. 4 is started when the image display control section 20 newly identifies the second object.

Step S401: The image display control section 20 determines whether or not the first object has already been identified and the attention-attracting image for the first object has already been displayed in the first region of the windshield 30. In a case where the attention-attracting image for the first object has been displayed (S401; Yes), the procedure proceeds to step S402, whereas, in a case where the attention-attracting image for the first object has not been displayed (S401; No), the procedure proceeds to step S404.

Step S402: The image display control section 20 determines whether or not the display position of the attention-attracting image for the identified second object overlaps, in the first region of the windshield 30, with the display position of the attention-attracting image for the first object. In a case where it is determined that the image display positions of the first object and the second object overlap with each other (S402; Yes), the procedure proceeds to step S403, whereas, in a case where it is determined that the image display positions of the first object and the second object do not overlap with each other (S402; No), the procedure proceeds to step S404.

Step S403: Since the attention-attracting image for the first object and the attention-attracting image for the second object overlap with each other, the image display control section 20 displays the attention-attracting image for the second object at a predetermined position not in the first region of the windshield 30 but in the second region of the windshield 30.

For example, in the case of FIG. 5, the attention-attracting image 101 for the first object 100 is displayed in the first region 201 of the windshield 30, and the attention-attracting image 102 for the second object (not visually recognized) is displayed in a second region 202 of the windshield 30. By this process, the attention-attracting image for the first object and the attention-attracting image for the second object can be displayed at the same time so as not to overlap with each other on the windshield 30. Here, when the attention-attracting image for the second object originally displayed in the first region of the windshield 30 is displayed in the second region of the windshield 30, if the attention-attracting image is smoothly moved from the first region to the second region while being kept displayed, the driver easily notices the change of the image.

Step S404: Since no overlap occurs between the attention-attracting image for the first object and the attention-attracting image for the second object, the image display control section 20 displays the attention-attracting image for the second object at a display position, which is unchanged from that set by the object identification section 21, in the first region of the windshield 30. The attention-attracting image for the second object having been already displayed in the second region of the windshield 30 is returned to the first region of the windshield 30 so as to be displayed in the first region. Accordingly, attention can be more appropriately attracted to the second object.

For example: in the case of FIG. 3, the first object is not detected, and thus the attention-attracting image 102 for the second object is displayed in the first region 201 of the windshield 30; and, in the case of FIG. 6, even though the first object 100 and the second object are detected, the display positions of the attention-attracting images for both objects do not overlap with each other, and thus the attention-attracting image 102 for the second object is displayed in the first region 201 of the windshield 30. Here, when the attention-attracting image for the second object having been displayed in the second region of the windshield 30 is displayed in (returned to) the first region of the windshield 30, if the attention-attracting image is smoothly moved from the second region to the first region while being kept displayed, the driver easily notices the change of the image.

Step S405: The image display control section 20 determines whether or not the second object has come to be not identified any more. In a case where the second object is kept identified (S405; No), the procedure returns to step S401 and the image display control is continued, whereas, in a case where the second object has come to be not identified any more (S405; Yes), the image display control is ended.

[Operations and Effects]

In the above-described vehicular display control device 1 according to the present embodiment, when it is determined that the display position of the attention-attracting image for the first object detected in front of the vehicle and the display position of the attention-attracting image for the second object detected on a lateral side relative to the vehicle or behind the vehicle overlap with each other in the first region of the windshield 30, the attention-attracting image for the second object is moved to the second region so as to be displayed in the second region. Accordingly, the visibility, for the driver, of the attention-attracting images can be inhibited from being reduced, and attention can be appropriately attracted to the objects detected near the vehicle.

In addition, in this vehicular display control device 1, an augmented reality display region in which an image can be displayed so as to overlap with the real view in front of the vehicle, is used as the first region, and the image display control section 20 displays, in the first region, the first image at such a position as to overlap with the first object, whereby attention can be more appropriately attracted to the first object. In addition, in this vehicular display control device 1, when the first image determined to overlap, in the first region, with the second image in terms of display position is not displayed any more, the image display control section 20 moves the second image from the second region to the first region so as to display the second image in the first region, whereby attention can be more appropriately attracted to the second object.

[Modification]

Figure 7:
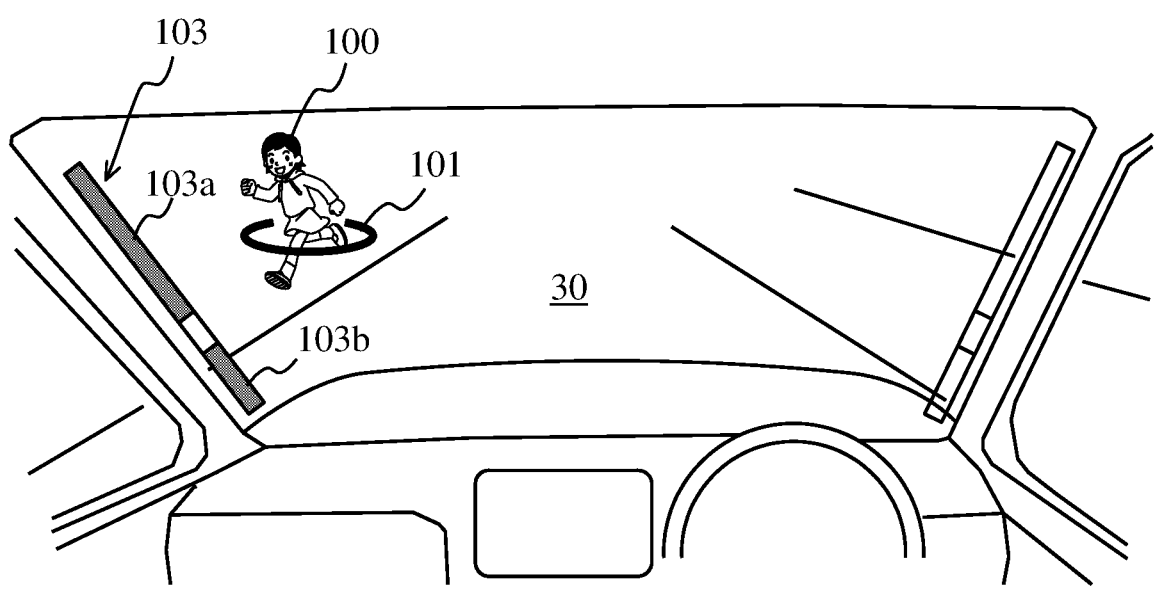
FIG. 7 is a view of a modification in which attention-attracting images for the first object and the second object are displayed on the windshield.

Instead of the above-described attention-attracting image 102, a predetermined diagram, of which the display manner is changeable, may be used to attract attention to the second object. FIG. 7 shows an example in which attention is attracted to the second object by bar-shaped indicators 103 provided on both sides of the first region of the windshield 30. For example, when the second object is identified by the image display control section 20, display at a place corresponding to the area in which the second object is detected, is changed (by means of shading, colors, lighting/blinking, or the like), whereby attention can be attract to the second object. In the example in FIG. 7, an attention attraction direction is let known in a simplified manner by performing display differently as follows: display at a place 103a is changed for the second object existing on a lateral side relative to the vehicle, and display at a place 103b is changed for the second object existing behind the vehicle.

While the invention has been described in detail, the foregoing description is in all aspects illustrative and not restrictive. It will be understood that numerous other modifications and variations can be devised without departing from the scope of the invention.

What is claimed is:

1. A vehicular display control device which controls an image that is projected on a windshield of a vehicle by using a head-up display function,
the vehicular display control device comprising:
    a detection section configured to detect an object near the vehicle; and
    a display control section configured to
        display, when a predetermined first object is detected in front of the vehicle by the detection section, a first image for attracting attention to the first object, at a position that is based on the first object and that is in a predetermined first region on the windshield, and
        display, when a predetermined second object is detected on a lateral side relative to the vehicle or behind the vehicle by the detection section, a second image for attracting attention to the second object, at a predetermined position in the first region, wherein
    when determining that a display position of the second image overlaps, in the first region, with a display position of the first image, the display control section moves the second image from the first region to a predetermined second region, on the windshield, different from the first region so as to display the second image in the second region, and
    when the first image determined to overlap, in the first region, with the second image in terms of display position is not displayed any more, the display control section moves the second image from the second region to the first region so as to display the second image in the first region.

2. The vehicular display control device according to claim 1, wherein
    the display control section causes a display position in the first region to be different between: the second object detected on the lateral side relative to the vehicle by the detection section; and the second object detected behind the vehicle by the detection section.

3. The vehicular display control device according to claim 1, wherein
    the display control section causes a display characteristic in the first region to be different between: the second object detected on the lateral side relative to the vehicle by the detection section; and the second object detected behind the vehicle by the detection section.

4. A vehicular display control device which controls an image that is projected on a windshield of a vehicle by using a head-up display function,
the vehicular display control device comprising:
    a detection section configured to detect an object near the vehicle; and
    a display control section configured to
        display, when a predetermined first object is detected in front of the vehicle by the detection section, a first image for attracting attention to the first object, at a position that is based on the first object and that is in a predetermined first region on the windshield, and
        display, when a predetermined second object is detected on a lateral side relative to the vehicle or behind the vehicle by the detection section, a second image for attracting attention to the second object, at a predetermined position in the first region, wherein
    when determining that a display position of the second image overlaps, in the first region, with a display position of the first image, the display control section moves the second image from the first region to a predetermined second region, on the windshield, different from the first region so as to display the second image in the second region,
    an augmented reality display region in which an image can be displayed so as to overlap with a real view in front of the vehicle, is used as the first region,
    the display control section displays, in the first region, the first image at such a position as to overlap with the first object, and
    when the first image determined to overlap, in the first region, with the second image in terms of display position is not displayed any more, the display control section moves the second image from the second region to the first region so as to display the second image in the first region.

5. The vehicular display control device according to claim 4, wherein
    the display control section causes a display position in the first region to be different between: the second object detected on the lateral side relative to the vehicle by the detection section; and the second object detected behind the vehicle by the detection section.

6. The vehicular display control device according to claim 4, wherein
    the display control section causes a display characteristic in the first region to be different between: the second object detected on the lateral side relative to the vehicle by the detection section; and the second object detected behind the vehicle by the detection section.

\* \* \* \* \*